US011355814B2

(12) United States Patent
Lee et al.

(10) Patent No.: US 11,355,814 B2
(45) Date of Patent: Jun. 7, 2022

(54) CROSS-LINKED POLYOLEFIN SEPARATOR AND MANUFACTURING METHOD FOR SAME

(71) Applicant: LG Chem, Ltd., Seoul (KR)

(72) Inventors: Joo-Sung Lee, Daejeon (KR); Won-Sik Bae, Daejeon (KR); Bi-Oh Ryu, Daejeon (KR); Heon-Sik Song, Daejeon (KR)

(73) Assignee: LG Chem, Ltd.

( * ) Notice: Subject to any disclaimer, the term of this patent is extended or adjusted under 35 U.S.C. 154(b) by 139 days.

(21) Appl. No.: 16/755,444

(22) PCT Filed: Jun. 11, 2019

(86) PCT No.: PCT/KR2019/007030
§ 371 (c)(1),
(2) Date: Apr. 10, 2020

(87) PCT Pub. No.: WO2019/240475
PCT Pub. Date: Dec. 19, 2019

(65) Prior Publication Data
US 2020/0266411 A1    Aug. 20, 2020

(30) Foreign Application Priority Data
Jun. 12, 2018  (KR) .......................... 10-2018-0067719

(51) Int. Cl.
*H01M 50/417*    (2021.01)
*C08K 5/01*    (2006.01)
(Continued)

(52) U.S. Cl.
CPC ............. *H01M 50/417* (2021.01); *C08K 5/01* (2013.01); *H01M 10/052* (2013.01);
(Continued)

(58) Field of Classification Search
CPC ............. H01M 50/411; H01M 50/403; H01M 50/409; H01M 50/40; H01M 10/052; C08K 5/01; Y02E 60/10
(Continued)

(56) References Cited

U.S. PATENT DOCUMENTS 2,560,339  A * 7/1951  Gessler ................... C08K 5/01
                                                          524/491
2007/0117933 A1   5/2007  Giacobbi et al.
(Continued)

FOREIGN PATENT DOCUMENTS

CN    105576172 A    5/2016
JP    2618866 B2    6/1997
(Continued)

OTHER PUBLICATIONS

International Search Report for Application No. PCT/KR2019/007030 dated Sep. 20, 2019.
(Continued)

*Primary Examiner* — Robert S Jones, Jr.
(74) *Attorney, Agent, or Firm* — Lerner, David, Littenberg, Krumholz & Mentlik, LLP

(57) ABSTRACT

A method for manufacturing a crosslinked polyolefin separator, including the steps of: (S1) introducing polyolefin having a weight average molecular weight of 200,000-1,000,000, a first diluting agent, alkoxysilane containing a carbon-carbon double bonded group, an initiator and a crosslinking catalyst to an extruder; (S2) introducing a second diluting agent to the extruder, followed by mixing, to carry out reactive extrusion of a silane-grafted polyolefin composition; (S3) molding and orienting the reactive extruded silane-grafted polyolefin composition in a form of a sheet; (S4) extracting the first diluting agent and the second diluting agent from the oriented sheet to obtain a silane-
(Continued)

grafted polyolefin porous membrane; (S5) thermally fixing the porous membrane; and (S6) crosslinking the porous membrane in the presence of water and a crosslinked polyolefin separator are provided. According to the method, it is possible to provide a separator which shows a decrease in intensive silane crosslinking on the surface thereof.

20 Claims, 4 Drawing Sheets

(51) Int. Cl.
    *H01M 50/411* (2021.01)
    *H01M 50/403* (2021.01)
    *H01M 10/052* (2010.01)
    *H01M 50/40* (2021.01)

(52) U.S. Cl.
    CPC ......... *H01M 50/40* (2021.01); *H01M 50/403* (2021.01); *H01M 50/411* (2021.01); *Y02E 60/10* (2013.01)

(58) Field of Classification Search
    USPC ........................................................ 429/249
    See application file for complete search history.

(56) References Cited

U.S. PATENT DOCUMENTS

| | | | |
|---|---|---|---|
| 2013/0171499 A1 | 7/2013 | Yang et al. | |
| 2014/0011093 A1 | 1/2014 | Kim et al. | |
| 2015/0017512 A1 | 1/2015 | Terwonne et al. | |
| 2016/0126518 A1* | 5/2016 | Park | H01M 50/403 521/143 |

FOREIGN PATENT DOCUMENTS

| | | |
|---|---|---|
| JP | H11172036 A | 6/1999 |
| JP | 2011198507 A | 10/2011 |
| JP | 2014524113 A | 9/2014 |
| JP | 6219268 B2 | 10/2017 |
| KR | 20060123275 A | 12/2006 |
| KR | 20120113647 A | 10/2012 |
| KR | 20160017166 A | 2/2016 |
| KR | 20160038918 A | 4/2016 |
| KR | 20160052332 A | 5/2016 |
| KR | 20160129583 A | 11/2016 |
| KR | 20160131761 A | 11/2016 |
| KR | 20170044996 A | 4/2017 |
| KR | 20180033487 A | 4/2018 |

OTHER PUBLICATIONS

Extended Search Report for Application No. 19819887.1, dated Jan. 13, 2021, 6 pages.

Chinese Search Report for Application No. 201980004618.6, dated Sep. 6, 2021, 3 pages.

* cited by examiner

CROSS-LINKED POLYOLEFIN SEPARATOR AND MANUFACTURING METHOD FOR SAME

CROSS-REFERENCE TO RELATED APPLICATIONS

The present application is a national phase entry under 35 U.S.C. § 371 of International Application No. PCT/KR2019/007030 filed Jun. 11, 2019 which claims priority from Korean Patent Application No. 10-2018-0067719 filed on Jun. 12, 2018 with the Korean Intellectual Property Office, the disclosures of which are incorporated herein by reference in their entirety.

TECHNICAL FIELD

The present disclosure relates to a crosslinked polyolefin separator and a method for manufacturing the same.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni—MH, Ni—Cd and sulfuric acid-lead batteries using an aqueous electrolyte.

Such a lithium secondary battery includes a positive electrode, a negative electrode, an electrolyte and a separator. Particularly, it is required for the separator to have insulation property for separating the positive electrode and the negative electrode from each other and high ion conductivity for increasing lithium ion permeability based on high porosity.

In addition, it is required for the separator to have a broad interval between a shut-down temperature and a melt-down temperature so that a lithium secondary battery including the separator may ensure safety. To broaden the interval between a shut-down temperature and a melt-down temperature, it is required that the shut-down temperature is controlled to be decreased and the melt-down temperature is controlled to be increased.

As a method for increasing the melt-down temperature, there is use of a crosslinked porous membrane. However, when using crosslinking, a diluting agent required for forming pores and a crosslinking agent required for crosslinking may cause side reactions. Particularly, the crosslinking agent which has reacted with the diluting agent may migrate toward the surface of a separator along with the diluting agent during extrusion/stretching so that intensive crosslinking may occur only on the surface of the finished separator undesirably. When crosslinking occurs only on the surface of a separator as mentioned above, it is difficult to obtain a crosslinked polyolefin separator having a uniform melt-down temperature in the thickness direction. In addition, due to the over-crosslinking on the separator surface, it is difficult to form pores on the separator surface, thereby causing an increase in resistance.

DISCLOSURE

Technical Problem

The present disclosure is designed to solve the problems of the related art, and therefore the present disclosure is directed to providing a separator including silane-crosslinked polyolefin which shows a decrease in over-crosslinking on the surface thereof, and has a uniform crosslinking degree in the thickness direction or has a higher crosslinking degree inside thereof as compared to the surface thereof.

Thus, the present disclosure is directed to providing a crosslinked polyolefin separator which has a uniform melt-down temperature in the thickness direction thereof, wherein the melt-down temperature is higher as compared to the conventional separator, and shows a decreased resistance value.

The present disclosure is also directed to providing a method for manufacturing the separator.

Technical Solution

In one aspect of the present disclosure, there is provided a crosslinked polyolefin separator according to any one of the following embodiments.

According to the first embodiment, there is provided a crosslinked polyolefin separator which includes silane-crosslinked polyolefin, wherein silane crosslinking shows an Infrared Spectroscopy (IR) peak intensity of 0.001-0.012 in the thickness direction of the separator, and the ratio (B/A) of IR peak intensity (B) of central silane crosslinking in the thickness direction of the separator to IR peak intensity (A) of silane cros slinking on one surface of the separator is 0.8-1.2.

According to the second embodiment, there is provided a crosslinked polyolefin separator which includes silane-crosslinked polyolefin, wherein silane crosslinking shows an Infrared Spectroscopy (IR) peak intensity of 0.001-0.012 in the thickness direction of the separator, and the ratio (C/A) of IR peak intensity (C) of silane crosslinking at the point corresponding to ¼ of the total thickness of the separator from one surface of the separator to IR peak intensity (A) of silane crosslinking on one surface of the separator is 0.9-1.5.

According to the third embodiment, there is provided a crosslinked polyolefin separator which includes silane-crosslinked polyolefin, wherein the ratio ((A, B or C)/D) of IR peak intensity (A,B or C) at 1030 $cm^{-1}$ to IR peak intensity (D) at 2847 $cm^{-1}$ in the thickness direction of the separator is 0.001-0.012, and the ratio (B/A) of IR peak intensity (B) of central silane crosslinking in the thickness direction of the separator to IR peak intensity (A) of silane crosslinking on one surface of the separator is 0.8-1.2.

According to the fourth embodiment, there is provided the crosslinked polyolefin separator as defined in the first or the second embodiment, wherein the silane crosslinking IR peak appears at 1030 $cm^{-1}$.

According to the fifth embodiment, there is provided the crosslinked polyolefin separator as defined in any one of the first to the fourth embodiments, wherein the content of silane (Si) in the separator is 150-900 ppm parts by weight based on 100 parts by weight of the separator.

According to the sixth embodiment, there is provided the crosslinked polyolefin separator as defined in any one of the first to the fifth embodiments, which has a crosslinking degree of 15-90%.

According to the seventh embodiment, there is provided the crosslinked polyolefin separator as defined in any one of the first to the sixth embodiments, which has a crosslinking density (number of Si—O—Si crosslinking spots per unit volume) of 0.01 mol/L or more.

In another aspect of the present disclosure, there is provided a method for manufacturing a crosslinked polyolefin separator according to any one of the following embodiments.

According to the eighth embodiment, there is provided a method for manufacturing a crosslinked polyolefin separator, including the steps of:

(S1) introducing polyolefin having a weight average molecular weight of 200,000-1,000,000, a first diluting agent, alkoxysilane containing a carbon-carbon double bonded group, an initiator and a crosslinking catalyst to an extruder, followed by mixing;

(S2) introducing a second diluting agent to the extruder, followed by mixing, to carry out reactive extrusion of a silane-grafted polyolefin composition;

(S3) molding the reactive extruded silane-grafted polyolefin composition into the form of a sheet, and stretching the sheet;

(S4) extracting the first diluting agent and the second diluting agent from the stretched sheet to obtain a silane-grafted polyolefin porous membrane;

(S5) thermally fixing the porous membrane; and (S6) crosslinking the porous membrane in the presence of water.

According to the ninth embodiment, there is provided the method for manufacturing a crosslinked polyolefin separator as defined in the eighth embodiment, wherein the ratio (t2/t1) of the time (t2) elapsed from the introduction of the second diluting agent to the extrusion to the time (t1) elapsed from the introduction of the first diluting agent to the extrusion is 0.1-0.7.

According to the tenth embodiment, there is provided the method for manufacturing a crosslinked polyolefin separator as defined in the eighth or the ninth embodiment, wherein the weight ratio of the first diluting agent to the second diluting agent is 50:50-80:20.

According to the eleventh embodiment, there is provided the method for manufacturing a crosslinked polyolefin separator as defined in any one of the eighth to the tenth embodiments, wherein each of the first diluting agent and the second diluting agent independently includes liquid paraffin oil, solid paraffin oil, mineral oil, wax, soybean oil, phthalates, aromatic ethers, C10-C20 fatty acids, C10-C20 fatty acid alcohols, fatty acid esters or a mixture of at least two of them.

According to the twelfth embodiment, there is provided the method for manufacturing a crosslinked polyolefin separator as defined in any one of the eighth to the eleventh embodiments, wherein the second diluting agent has a dynamic viscosity equal to or lower than the dynamic viscosity of the first diluting agent.

According to the thirteenth embodiment, there is provided the method for manufacturing a crosslinked polyolefin separator as defined in the twelfth embodiment, wherein each of first diluting agent and the second diluting agent independently has a dynamic viscosity of 5-100 cSt at 40° C., and the difference in dynamic viscosity between the first diluting agent and the second diluting agent is 5 cSt or more.

According to the fourteenth embodiment, there is provided the method for manufacturing a crosslinked polyolefin separator as defined in the thirteenth embodiment, wherein the difference in dynamic viscosity between the first diluting agent and the second diluting agent is 10 cSt or more.

According to the fifteenth embodiment, there is provided the method for manufacturing a crosslinked polyolefin separator as defined in any one of the eighth to the fourteenth embodiments, wherein the total content of the first diluting agent and the second diluting agent is 100-350 parts by weight based on 100 parts by weight of the polyolefin.

According to the sixteenth embodiment, there is provided the method for manufacturing a crosslinked polyolefin separator as defined in any one of the eighth to the fifteenth embodiments, wherein the alkoxysilane containing a carbon-carbon double bonded group includes a compound represented by the following Chemical Formula 1:

[Chemical Formula 1]

wherein each of $R_1$, $R_2$ and $R_3$ independently represents a C1-C10 alkoxy group or C1-C10 alkyl group, with the proviso that at least one of $R_1$, $R_2$ and $R_3$ represents an alkoxy group; and R represents a vinyl group, acryloxy group, methacryloxy group, or a C1-C20 alkyl group, wherein at least one hydrogen atom of the alkyl group is substituted with a vinyl group, acryl group, acryloxy group, methacryloxy group, or methacryl group.

According to the seventeenth embodiment, there is provided the method for manufacturing a crosslinked polyolefin separator as defined in the sixteenth embodiment, wherein the alkoxysilane containing a carbon-carbon double bonded group includes vinyltrimethoxysilane, vinyltriethoxysilane, vinyltriacetoxysilane, (3-methacryloxypropyl)trimethoxysilane, (3-methacryloxypropyl)triethoxysilane, vinylmethyldimethoxysilane, vinyl-tris(2-methoxyethoxy)silane, vinylmethyldiethoxysilane or a mixture of at least two of them.

According to the eighteenth embodiment, there is provided the method for manufacturing a crosslinked polyolefin separator as defined in any one of the eighth to the seventeenth embodiments, wherein the content of the alkoxysilane containing a carbon-carbon double bonded group is 0.1-3.0 parts by weight based on 100 parts by weight of the total weight of the polyolefin, the first diluting agent and the second diluting agent, and the content of the initiator is 0.1-20 parts by weight based on 100 parts by weight of the alkoxysilane containing a carbon-carbon double bonded group.

According to the nineteenth embodiment, there is provided the method for manufacturing a crosslinked polyolefin separator as defined in any one of the eighth to the eighteenth embodiments, wherein the content of the crosslinking catalyst is 0.1-20 parts by weight based on 100 parts by weight of the alkoxysilane containing a carbon-carbon double bonded group.

According to the twentieth embodiment, there is provided the method for manufacturing a crosslinked polyolefin separator as defined in any one of the eighth to the nineteenth embodiments, wherein the crosslinking catalyst includes dibutyltin dilaurate, dibutyltin diacetate, stannous acetate, stannous caprylate, zinc naphthenate, zinc caprylate, cobalt naphthenate, ethylamine, dibutylamine, hexylamine, pyridine, sulfuric acid, hydrochloric acid, benzoic acid, sulfonic acid, acetic acid, stearic acid, maleic acid or a mixture of at least two of them.

According to the twenty first embodiment, there is provided the method for manufacturing a crosslinked polyolefin separator as defined in any one of the eighth to the twentieth embodiments, wherein the thermal fixing is carried out at a temperature of 100-140° C.

Advantageous Effects

According to an embodiment of the present disclosure, there is provided a crosslinked polyolefin separator having a constant crosslinking degree in the thickness direction thereof or having a higher crosslinking degree in the inner part thereof as compared to the surface thereof. As a result, the separator shows a decreased surface resistance and thus provides improved physical properties, such as output or cycle characteristics, of an electrochemical device.

In the method for manufacturing a crosslinked polyolefin separator according to an embodiment of the present disclosure, the first diluting agent is introduced with the initiator and crosslinking agent at a predetermined ratio in the initial stage of reactive extrusion during the preparation of a silane-grafted polyolefin composition, and then the second diluting agent is introduced alone in a later stage of reactive extrusion, thereby reducing a phenomenon in which crosslinking occurs mainly on the surface of the separator.

BEST MODE

Figure 1:
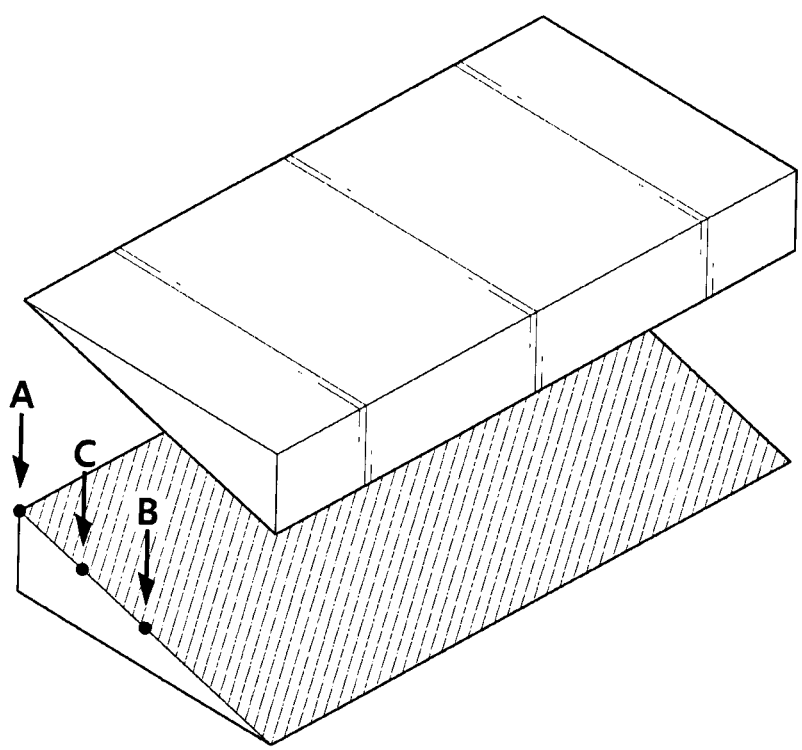
FIG. 1 is a schematic view illustrating a method for analyzing a crosslinking degree in the thickness direction of a separator through infrared spectrometry (IR), after exposing a separator specimen through inclined cutting (1°).
Figure 2:
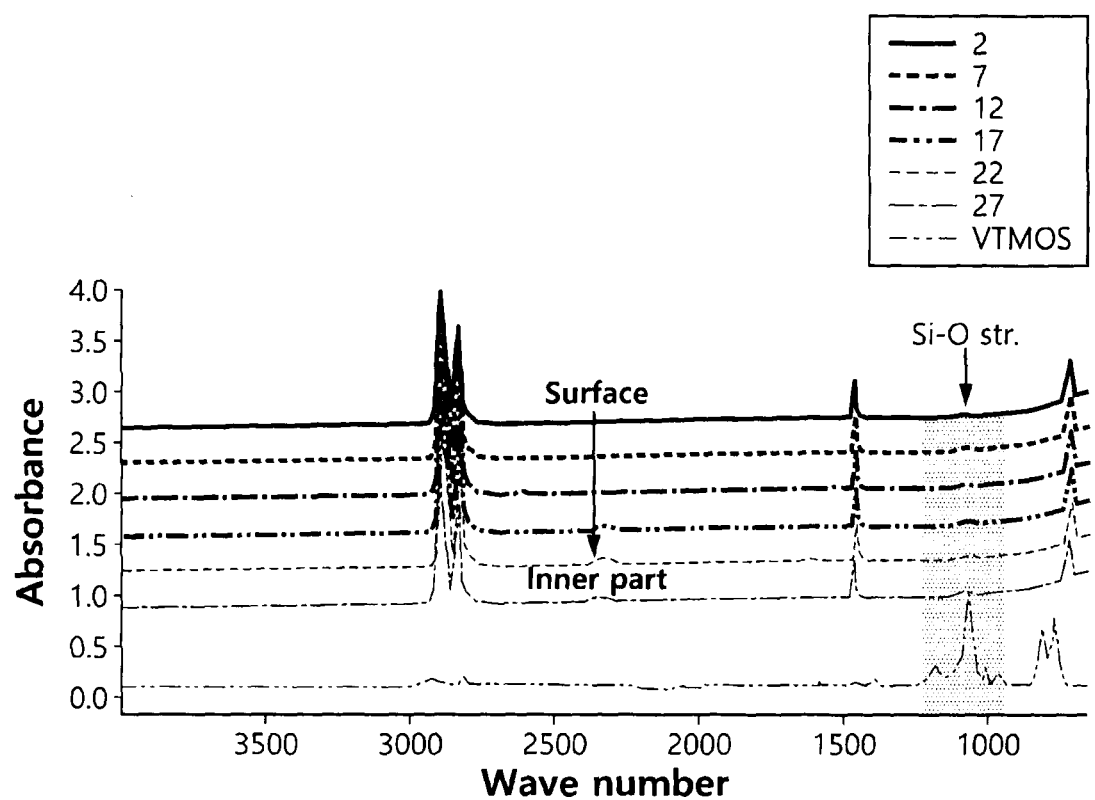
FIG. 2 shows the separator according to an embodiment of the present disclosure and the IR spectrum in the thickness direction of the separator.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is indirectly connected to another portion' by way of the other element interposed between them. Further, the connection refers fo not only a physical connection, but it also includes an electrochemical connection.

Throughout the specification, the expression 'a part [includes] an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination(s) thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In one aspect of the present disclosure, there are provided a crosslinked polyolefin separator and a method for manufacturing the same.

A separator used for a lithium secondary battery shows excellent safety, when it has a large difference between the shut-down temperature and the melt-down temperature. Herein, in order to broaden the interval between them, it is required that the shut-down temperature is controlled to be decreased and the melt-down temperature is controlled to be increased.

Therefore, the present disclosure uses silane crosslinking in order to obtain a separator having a higher melt-down temperature. Herein, the melt-down temperature may be controlled through the crosslinking degree of a crosslinked polyolefin porous membrane, or the like. For example, when the crosslinking degree is increased, the melt-down temperature is increased. In addition, when the crosslinking degree is decreased, the melt-down temperature is decreased.

Such a crosslinked polyolefin membrane may be obtained through mixing and reactive extrusion of polyolefin, a diluting agent and a crosslinking agent (e.g. alkoxysilane containing a carbon-carbon doubled bonded group, initiator, crosslinking agent, or the like). When the diluting agent and the crosslinking agent are introduced at once, they may cause side reactions. The present inventors have found that a diluting agent, particularly a diluting agent having low viscosity, migrates toward the surface of a separator during reactive extrusion, and the diluting agent and the crosslinking agent cause side reactions so that intensive crosslinking may occur on the surface of the separator undesirably.

To solve the above-mentioned problem, the present disclosure is directed to providing a separator which shows a decrease in intensive crosslinking on the surface thereof, and a method for manufacturing the same.

In one aspect of the present disclosure, there is provided a crosslinked polyolefin separator which includes silane-crosslinked polyolefin, wherein silane crosslinking shows an Infrared Spectroscopy (IR) peak intensity of 0.001-0.012 in the thickness direction of the separator, and the ratio (B/A)

of IR peak intensity (B) of central silane crosslinking in the thickness direction of the separator to IR peak intensity (A) of silane crosslinking on one surface of the separator is 0.8-1.2.

Herein, the silane crosslinking IR peak appears at 1030 cm$^{-1}$. The peak at 1030 cm$^{-1}$ represents the presence of Si—O—Si.

According to an embodiment of the present disclosure, silane crosslinking in the crosslinked polyolefin separator shows a peak intensity of 0.001-0.012 in infrared spectroscopy (IR). Since silane crosslinking (Si—O—Si) is present in the separator as determined from the peak intensity range, the separator shows a high melt-down temperature of about 175° C. or higher, thereby providing an electrochemical device with improved safety. According to an embodiment of the present disclosure, the peak intensity range represents whether Si—O—Si is present in the separator or not. In other words, when a separator does not show the above-defined IR peak intensity at around 1030 cm$^{-1}$ as determined from IR peaks, no Si—O—Si crosslinking is present in the separator. In this case, it is not possible to accomplish a desired level of melt-down temperature as defined in the present disclosure.

Meanwhile, the ratio (B/A) of IR peak intensity (B) of central silane crosslinking in the thickness direction of the separator to IR peak intensity (A) of silane crosslinking on one surface of the separator is controlled to 0.8-1.2 by controlling the introduction time point, kind and amount of diluents, when manufacturing the silane crosslinked polyolefin separator. As a result, according to an embodiment of the present disclosure, it is possible to provide a separator with a reduced resistance value on the surface thereof and uniform physical properties or thermal properties in the thickness direction of the separator, since the silane crosslinking IR peak intensity on the surface is maintained at a level equal to or similar to the silane crosslinking IR peak intensity inside of the separator. When the B/A ratio is less than 0.8, the separator surface shows a high resistance value, and thus causes degradation of output when the separator is used as a separator for an electrochemical device. When the B/A ratio is larger than 1.2, the separator shows a high resistance value in the inner part of the separator, and thus causes degradation of output when the separator is used as a separator for an electrochemical device.

According to the present disclosure, the silane crosslinking IR peak intensity may be determined by the following method, but is not limited thereto.

First, a separator specimen to be tested is prepared with a predetermined size. Next, the separator is subjected to inclined cutting at a predetermined inclination angle by using an inclined cutting analyzer.

The resultant separator is divided into equal parts with a predetermined interval in the thickness direction of the separator by using a Fourrier Transformation-Infrared (FT-IR) spectrometer, and then silane crosslinking IR peak intensity from the surface of the separator to the inner part thereof is measured three times, followed by calculation of the average value.

Herein, the specimen size, inclination angle, interval of equal parts and measurement times may be varied depending on the thickness and size of a separator in order to reduce a range of errors.

FIG. 1 is a schematic view illustrating a method for analyzing a crosslinking degree in the thickness direction of a separator through infrared spectrometry (IR), after exposing a separator specimen through inclined cutting (1°).

Meanwhile, the crosslinked polyolefin separator showing a decrease in intensive crosslinking on the surface thereof according to an embodiment of the present disclosure is characterized by the ratio (C/A) of IR peak intensity (C) of silane crosslinking at the point corresponding to ¼ of the total thickness of the separator from one surface of the separator to IR peak intensity (A) of silane crosslinking on one surface of the separator.

Particularly, according to another embodiment of the present disclosure, there is provided a crosslinked polyolefin separator which includes silane-crosslinked polyolefin, wherein silane crosslinking shows an Infrared Spectroscopy (IR) peak intensity of 0.001-0.012 in the thickness direction of the separator, and the ratio (C/A) of IR peak intensity (C) of silane crosslinking at the point corresponding to ¼ of the total thickness of the separator from one surface of the separator to IR peak intensity (A) of silane crosslinking on one surface of the separator is 0.9-1.5.

Thus, it is possible to provide a crosslinked polyolefin separator which shows a decrease in intensive crosslinking on the surface thereof by controlling the IR peak intensity of silane crosslinking at the point corresponding to ¼ of the total thickness of the separator to be equal to or similar to the IR peak intensity of silane crosslinking on one surface of the separator. When the C/A ratio is less than 0.9, the separator surface shows a high resistance value, and thus causes degradation of output, when the separator is used as a separator for an electrochemical device. When the C/A ratio is larger than 1.5, the separator shows a high resistance value in the inner part of the separator, and thus causes degradation of output when the separator is used as a separator for an electrochemical device.

Meanwhile, according to still another embodiment of the present disclosure, there is provided a crosslinked polyolefin separator which includes silane-crosslinked polyolefin, wherein the ratio ((A, B or C)/D) of IR peak intensity (A, B or C) at 1030 cm$^{-1}$ to IR peak intensity (D) at 2847 cm$^{-1}$ in the thickness direction of the separator is 0.001-0.012, and the ratio (B/A) of IR peak intensity (B) of central silane crosslinking in the thickness direction of the separator to IR peak intensity (A) of silane crosslinking on one surface of the separator is 0.8-1.2.

In the crosslinked polyolefin separator according to an embodiment of the present disclosure, the IR peak at 2847 cm$^{-1}$ represents CH bond stretching and the value of IR peak at 2847 cm$^{-1}$ substantially converges to 1. In other words, in the crosslinked polyolefin separator according to an embodiment of the present disclosure, the ratio ((A, B or C)/D) of IR peak intensity (A, B or C) at 1030 cm$^{-1}$ to IR peak intensity (D) at 2847 cm$^{-1}$ in the thickness direction of the separator is 0.001-0.012. Herein, (A, B or C)/D may represent the ratio of silane crosslinking based on the polyolefin backbone.

According to an embodiment of the present disclosure, the silane crosslinking IR peak intensity in the thickness direction of the separator may be 0.002-0.010 or 0.003-0.008.

According to an embodiment of the present disclosure, the content of silane (Si) in the separator may be 150-900 ppm parts by weight, 250-800 ppm parts by weight, or 350-750 ppm parts by weight, based on 100 parts by weight of the separator. Within the above-defined range, it is possible to accomplish desired mechanical and thermal properties of the separator. At the same time, it is possible to provide an adequate amount of silane crosslinking, and thus to maintain a resistance value suitable for use as a separator for an electrochemical device.

The silane content in the separator may be determined by the following method, but is not limited thereto. For example, the silane content in the separator may be determined by using an inductively coupled plasma-mass spectrometer (ICP-MS, Axiom model, wherein MC-ICP-MS, Axiom is AXIOM MC model available from Thermo Elemental Ltd. (UK) and having a high-resolution function in combination).

According to an embodiment of the present disclosure, it is possible to provide a separator which shows uniform IR peaks in the thickness direction thereof by controlling the introduction time point, kind and amount of the first diluent and the second diluent.

According to an embodiment of the present disclosure, there is provided a separator which shows uniform IR peaks in the thickness direction thereof, or shows higher IR peak intensity in the inner part of the separator as compared to the surface thereof. In other words, it is possible to prevent over-crosslinking of silane on the separator surface and a decrease in porosity, and thus to provide a separator having relatively low resistance.

In addition, it can be seen that when IR peaks are uniform in the thickness direction of a separator, silane crosslinking is accomplished uniformly in the thickness direction. Therefore, it is possible to provide a separator having uniform heat shrinkage and mechanical strength in the thickness direction.

The separator according to an embodiment of the present disclosure has a crosslinking degree of 15-90%, 20-80% or 25-75%. When the crosslinking degree is within the above-defined range, the melt-down temperature may be increased to a desired range so that there is a low possibility of the problem of breakage and gelling during an stretching step.

Meanwhile, according to an embodiment of the present disclosure, the separator may have a crosslinking density (number of Si—O—Si crosslinking spots per unit volume) of 0.01 mol/L or more, 0.01-0.10 mol/L, 0.02-0.08 mol/L, or 0.03-0.07 mol/L.

The present inventors have found that when the crosslinking degree is within the above-defined range, the separator shows excellent heat resistance and the melt-down temperature is improved. When the melt-down temperature is high, the separator according to the present disclosure may be applied to industrial fields, such as vehicles, requiring high capacity and safety.

Meanwhile, the present inventors have studies about a correlation between a change in crosslinking degree and a change in crosslinking structure. Thus, a change in crosslinking structure is represented by crosslinking density.

Figure 4:
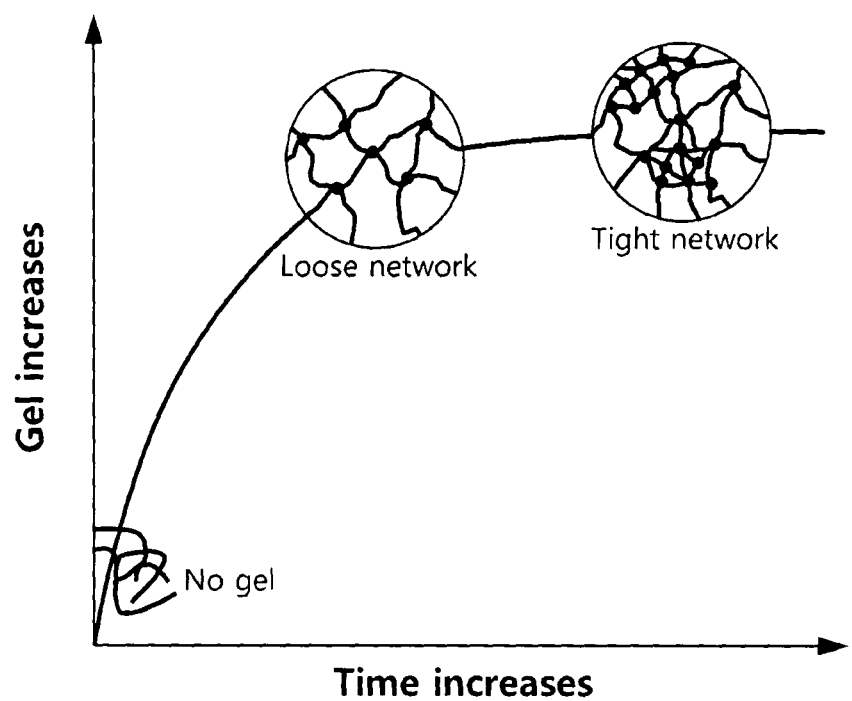
FIG. 4 is a schematic view illustrating a change in crossliniking structure with the lapse of time in the form of crosslinking density.

As mentioned above, according to an embodiment of the present disclosure, the separator may have a crosslinking density of 0.01 mol/L or more. When the crosslinking density is less than 0.01 mol/L, crosslinking is in a loose state. When the crosslinking density is 0.01 mol/L or more, crosslinking degree is in a tight state. This is shown in FIG. 4. Thus, it is possible to obtain high mechanical strength and to reduce shrinkage at high temperature. Particularly, high-temperature shrinkage is reduced gradually at 0.01 mol/L or more.

In another aspect of the present disclosure, there is provided a method for manufacturing a crosslinked polyolefin separator, including the steps of:

(S1) introducing polyolefin having a weight average molecular weight of 200,000-1,000,000, a first diluting agent, alkoxysilane containing a carbon-carbon double bonded group, an initiator and a crosslinking catalyst to an extruder, followed by mixing;

(S2) introducing a second diluting agent to the extruder, followed by mixing, to carry out reactive extrusion of a silane-grafted polyolefin composition;

(S3) molding the reactive extruded silane-grafted polyolefin composition into the form of a sheet, and stretching the sheet;

(S4) extracting the first diluting agent and the second diluting agent from the strethced sheet to obtain a silane-grafted polyolefin porous membrane;

(S5) thermally fixing the porous membrane; and (S6) crosslinking the porous membrane in the presence of water.

Hereinafter, the method for manufacturing a separator according to the present disclosure will be explained in more detail.

First, polyolefin having a weight average molecular weight of 200,000-1,000,000, a first diluting agent, alkoxysilane containing a carbon-carbon double bonded group, an initiator and a crosslinking catalyst are introduced to an extruder, followed by mixing (S1).

According to the related art, polyolefin, a diluting agent, a cros slinking agent, or the like were introduced to an extruder at once and mixed to obtain a silane-grafted polyolefin composition. However, such a process is problematic in that intensive crosslinking occurs only on the surface of a separator to provide non-uniform mechanical and thermal properties in the thickness direction of the separator.

On the contrary, according to the present disclosure, the type, amount and/or introduction time point of diluting agents are controlled, and thus it is possible to provide a separator having uniform mechanical and thermal properties, such as a crosslinking degree and melt-down temperature, in the thickness direction of the separator.

According to an embodiment of the present disclosure, polyolefin may be polyethylene; polypropylene; polybutylene; polypentene; polyhexene; polyoctene; a copolymer of at least two of ethylene, propylene, butene, pentene, 4-methylpentene, hexene, heptene and octene; or a mixture thereof.

Particularly, polyethylene includes low-density polyethylene (LDPE), linear low-density polyethylene (LLDPE), high-density polyethylene (HDPE), or the like. Among those, high-density polyethylene having a high crystallization degree and a high resin melting point is most preferred.

According to an embodiment of the present disclosure, polyethylene may have a weight average molecular weight of 200,000-1,000,000, 220,000-700,000, or 250,000-500,000. According to the present disclosure, it is possible to obtain a separator having excellent strength and heat resistance while ensuring uniformity and film forming processability of the separator film by using high-molecular weight polyolefin having a weight average molecular weight of 200,000-1,000,000 as a starting material for manufacturing the separator.

According to an embodiment of the present disclosure, the first diluting agent may include liquid or solid paraffin oil, mineral oil, wax, soybean oil, or the like, used currently for manufacturing a separator through a wet process.

According to an embodiment of the present disclosure, the first diluting agent may be one capable of liquid-liquid phase separation against polyolefin. For example, the first diluting agent may be a phthalic acid ester, such as dibutyl phthalate, dihexyl phthalate, dioctyl phthalate, or the like; aromatic ether, such as diphenyl ether, benzyl ether, or the like; C10-C20 fatty acid, such as palmitic acid, stearic acid, oleic acid, linolic acid, linolenic acid, or the like; C10-C20 fatty acid alcohol, such as palmitic acid alcohol, stearic acid alcohol, oleic acid alcohol, or the like; or a fatty acid such as palmitic acid mono-, di- or tri-ester, stearic acid mono-, di- or tri-ester, oleic acid mono-, di- or tri-ester, linoleic acid mono-, di- tri-ester, or the like, in which saturated or unsaturated fatty acid whose fatty acid group has 4-26 carbon atoms, or one or at least two fatty acids having an epoxy-substituted double bond of unsaturated fatty acid are ester-bound with a C1-C10 alcohol having 1-8 hydroxyl groups.

The first diluting agent may include any one of the above-described ingredients or a mixture of at least two of them.

According to an embodiment of the present disclosure, the alkoxysilane containing a carbon-carbon double bonded group is a crosslinking agent inducing silane crosslinking, and it fuctions to perform crosslining of polyolefin by grafting onto polyolefin through the carbon-carbon double bonded group, particularly a vinyl group, and then conducting an aqueous crosslinking caused by alkoxy groups.

According to an embodiment of the present disclosure, the alkoxysilane containing a carbon-carbon double bonded group may include a compound represented by the following Chemical Formula 1:

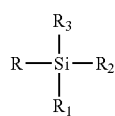

[Chemical Formula 1]

wherein each of $R_1$, $R_2$ and $R_3$ independently represents a C1-C10 alkoxy group or C1-C10 alkyl group, with the proviso that at least one of $R_1$, $R_2$ and $R_3$ represents an alkoxy group; and R represents a vinyl group, acryloxy group, methacryloxy group, or a C1-C20 alkyl group, wherein at least one hydrogen atom of the alkyl group is substituted with a vinyl group, acryl group, acryloxy group, methacryloxy group, or methacryl group.

Meanwhile, R may further include an amino group, epoxy group or an isocyanate group.

According to an embodiment of the present disclosure, the alkoxysilane containing a carbon-carbon double bonded group may include vinyltrimethoxysilane, vinyltriethoxysilane, vinyltriacetoxysilane, (3-methacryloxypropyl)trimethoxysilane, (3-methacryloxypropyl)triethoxysilane, vinylmethyl dimethoxysilane, vinyl-tris(2-methoxyethoxy)silane, vinylmethyldiethoxysilane or a mixture of at least two of them.

According to an embodiment of the present disclosure, the content of the alkoxysilane containing a carbon-carbon double bonded group may be 0.1-3.0 parts by weight, 0.2-2.0 parts by weight, or 0.5-1.5 parts by weight, based on 100 parts by weight of the total weight of the polyolefin, the first diluting agent and the second diluting agent. When the content of the alkoxysilane containing a carbon-carbon double bonded group satisfies the above-defined range, it is possible to prevent the problems of a decrease in crosslinking degree, caused by a low silane content and reduced graft ratio, and degradation of the appearance of an extruded sheet, caused by a high silane content and residue of unreacted silane.

According to an embodiment of the present disclosure, the initiator may be any initiator, as long as it can generate radicals. Non-limiting examples of the initiator include 2,5-dimethyl-2,5-di(tert-butylperoxy)hexane (DHBP), ben- zoyl peroxide, acetyl peroxide, dilauryl peroxide, di-tert-butyl peroxide, dicumyl peroxide, cumyl peroxide, hydrogen peroxide, potassium persulfate, or the like.

According to an embodiment of the present disclosure, the content of the initiator may be 0.1-20 parts by weight, particularly 1-10 parts by weight, and more particularly 2-5 parts by weight, based on 100 parts by weight of the alkoxysilane containing a carbon-carbon double bonded group. When the content of the initiator satisfies the above-defined range, it is possible to prevent the problems of a decrease in silane graft ratio, caused by a low content of initiator, and crosslinking between polyethylene molecules in an extruder, caused by a high content of initiator.

According to an embodiment of the present disclosure, the crosslinking catalyst is added to accelerate silane crosslinking.

According to an embodiment of the present disclosure, the crosslinking catalyst may be a carboxylate of metal, such as tin, zinc, iron, lead or cobalt, organic base, inorganic acid or an organic acid. Non-limiting examples of the crosslinking catalyst include metal carboxylates, such as dibutyltin dilaurate, dibutyltin diacetate, stannous acetate, stannous capylate, zinc naphthenate, zinc caprylate and cobalt naphthenate, organic bases, such as ethylamine, dibutylamine, hexylamine and pyridine, inorganic acids, such as sulfuric acid and hydrochloric acid, and organic acids, such as benzoic acid, sulfonic acid, acetic acid, stearic acid and maleic acid. Such crosslinking agents may be used alone or in combination.

According to an embodiment of the present disclosure, the content of crosslinking catalyst may be 0.1-20 parts by weight, 1-10 parts by weight, or 2-5 parts by weight, based on 100 parts by weight of the alkoxysilane containing a carbon-carbon double bonded group. When the content of crosslinking catalyst satisfies the above-defined range, it is possible to carry out silane crosslinking to a desired level and to prevent undesired side reactions in a lithium secondary battery. In addition, there is no cost-related problem, such as waste of the catalyst.

Then, the second diluting agent is introduced to and mixed in the extruder to carry out reactive extrusion of a silane grafted polyolefin composition (S2).

In other words, after the lapse of a predetermined time from the introduction and mixing of polyolefin having a weight average molecular weight of 200,000-1,000,000, the first diluting agent, alkoxysilane containing a carbon-carbon double bonded group, initiator and the crosslinking catalyst in the extruder, the second diluting agent is introduced to and mixed with the mixture.

As described above, since the time point of introduction and mixing of the first diluent and that of the second diluting agent are controlled to be different from each other according to the present disclosure, it is possible to reduce intensive silane crosslinking on the surface of the separator.

The second diluting agent is the same as described with reference to the first diluting agent.

According to an embodiment of the present disclosure, the second diluting agent may be the same as or different from the first diluting agent. Particularly, in order for the second diluting agent introduced alone (i.e. without any crosslinking additives, such as a crosslinking agent or crosslinking catalyst) after the lapse of a predetermined time to migrate easily toward the surface of the separator, the second diluting agent preferably has a dynamic viscosity equal to or lower than the dynamic viscosity of the first diluting agent.

When the dynamic viscosity of the second diluting agent is lower than that of the first diluting agent, the second diluting agent migrates easily toward the surface to prevent blocking of surface pores. In addition, when the second diluting agent has relative lower dynamic viscosity, the resultant crosslinked polyolefin has a small pore size to reduce the shut-down temperature. Therefore, it is possible to provide a crosslinked polyolefin separator having improved safety, since pore blocking occurs at a lower temperature.

In this context, according to an embodiment of the present disclosure, each of the dynamic viscosity of the first diluting agent and that of the second diluting agent may be independently 5-100 cSt, 10-90 cSt, 15-85 cSt, or 19.08-67.84 cSt at 40° C. Herein, the difference in dynamic viscosity between the first diluting agent and the second diluting agent may be 5 cSt or more, or 10 cSt or more.

According to an embodiment of the present disclosure, the total content of the first diluting agent and the second diluting agent may be 100-350 parts by weight, 125-300 parts by weight, or 150-250 parts by weight, based on 100 parts by weight of polyolefin. When the total content of diluting agents satisfies the above-defined range, it is possible to reduce the problems of a decrease in porosity and pore size, caused by a high content of polyolefin, a significant drop in permeability, caused by a decrease in interconnection of pores, and low processability, caused by an increase in viscosity of polyolefin solution and extrusion load. It is also possible to reduce the problems of breakage upon stretching and non-uniform thickness, generated by polyolefin not kneaded thermodynamically with the diluents but extruded in the form of gel due to a low content of polyolefin and degradation of kneadability of polyolefin with diluting agents.

According to an embodiment of the present disclosure, the weight ratio of the first diluting agent to the second diluting agent may be 50:50-80:20, 65:45-75:25, or 60:40-70:30. When the weight ratio of the first diluting agent to the second diluting agent satisfies the above-defined range, it is possible to reduce intensive crosslinking on the surface portion, caused by migration of the first diluting agent toward the surface of the separator during the extrusion/stretching step.

According to an embodiment of the present disclosure, the ratio (t2/t1) of the time (t2) elapsed from the introduction of the second diluting agent to the extrusion to the time (t1) elapsed from the introduction of the first diluting agent to the extrusion may be 0.1-0.7, 0.2-0.65, or 0.3-0.63.

When the elapsed time from the introduction of the first or the second diluting agent to extrusion satisfies the above-defined range, the first diluting agent allows the desired reaction, grafting of polyolefin with the alkoxysilane containing a carbon-carbon double bonded group, to occur uniformly in the extruder, and then the second diluting agent introduced alone subsequently migrates toward the wall side (outside) in the barrel portion and/or die of the extruder to reduce additional cros slinking on the surface portion during the step of forming a separator.

According to an embodiment of the present disclosure, if necessary, the silane-grafted polyolefin composition may further include conventional additives for improving specific functions, such as an antioxidant, UV stabilizer, antistatic agent, nucleating agent, or the like.

According to an embodiment of the present disclosure, the reactive extrusion step may be carried out by using a uniaxial extruder or biaxial extruder.

After that, the reactive extruded silane-grafted polyolefin composition is molded into the form of a sheet and stretched (S3).

For example, the reactive extruded silane-grafted polyolefin composition is extruded by using an extruder equipped with a T-die, or the like, and then cooled extrudate may be formed by using a general casting or calendering process using water-cooling or air-cooling mode.

According to an embodiment of the present disclosure, it is possible to provide a separator having improved mechanical strength and puncture strength through the stretching step as mentioned above.

According to an embodiment of the present disclosure, the stretching may be carried out by sequential or simultaneous stretching using a roll or tenter. The stretching ratio may be 3 times or more, or 4-10 times, each in the machine direction and transverse direction, and the total stretching ratio may be 14-100 times. When the stretching ratio satisfies the above-defined ratio, it is possible to prevent the problem of insufficient stretching in one direction, a failure in balance of physical properties between the machine direction and the transverse direction, and degradation of tensile strength and puncture strength. When the total stretching ratio satisfies the above-defined range, it is possible to prevent the problems of non-stretching or a failure in pore formation.

According to an embodiment of the present disclosure, the stretching temperature may be varied with the melting point of polyolefin and concentration and type of diluting agents.

According to an embodiment of the present disclosure, when the polyolefin is polyethylene, the diluting agent is liquid paraffin, the first diluting agent has a dynamic viscosity of 40-100 cSt at 40° C. and the second diluting agent has a dynamic viscosity of 5-60 cSt at 40° C., the stretching temperature may be 70-160° C., 90-140° C., or 100-130° C. in the machine direction, and may be 90-180° C., 110-160° C., or 120-150° C. in the transverse direction. When carrying out stretching in both directions at the same time, the stretching temperature may be 90-180° C., 110-160° C., or 120-150° C. When the stretching temperature satisfies the above-defined range, it is possible prevents the problem of breakage or non-stretching due to the lack of softness caused by a low stretching temperature. In addition, it is possible to prevent over-stretching or a difference in physical properties, caused by a high stretching temperature.

Then, the first diluting agent and the second diluting agent are extracted from the molded and stretched sheet to obtain a silane-grafted polyolefin porous membrane (S4).

According to an embodiment of the present disclosure, the first diluting agent and the second diluting agent are extracted from the porous membrane by using an organic solvent, and then the porous membrane may be dried.

According to an embodiment of the present disclosure, the organic solvent is not particularly limited, as long as it is capable of extraction of the diluting agents. However, it is suitable to use methyl ethyl ketone, methylene chloride or hexane having high extraction efficiency and showing a high drying rate.

According to an embodiment of the present disclosure, the extraction may be any conventional solvent extraction process, such as an immersion process, solvent spray process or ultrasonication process, and such processes may be used alone or in combination. After carrying out extraction, the content of residual diluting agents should be preferably 1 wt % or less. When the content of residual diluting agents is larger than 1 wt %, physical properties are degraded and permeability of the porous membrane is reduced. The content of residual diluting agents may be affected by extraction temperature and extraction time. To increase the solubility of diluting agents in the organic solvent, a higher extraction temperature is preferred. However, considering the safety problem caused by boiling of the organic solvent, the extraction temperature is preferably 40° C. or lower. When the extraction temperature equals to or is lower than the solidifying point of the diluting agents, extraction efficiency may be decreased significantly. Thus, the extraction temperature should be higher than the solidifying point of the diluting agents.

In addition, the extraction time may be varied with the thickness of a porous membrane. In the case of a separator having a thickness of 5-15 μm, the extraction time may be 1-3 minutes suitably.

Then, the porous membrane is thermally fixed (S5).

The thermal fixing is a process of fixing and heating the porous membrane so that the porous membrane to be shrunk may be fixed forcibly to remove residual stress.

According to an embodiment of the present disclosure, when the polyolefin is polyethylene, the thermal fixing temperature may be 100-140° C., 105-135° C., or 110-130° C. When the polyolefin is polyethylene and the thermal fixing temperature satisfies the above-defined range, polyolefin molecules may be rearranged to remove residual stress of the porous membrane, and the problem of pore blocking of the porous membrane caused by partial melting may be reduced. A higher thermal fixing temperature improves the heat shrinkage of a separator, while a lower thermal fixing temperature reduces the resistance of a separator.

According to an embodiment of the present disclosure, the thermal fixing time may be 10-120 seconds, 20-90 seconds, or 30-60 seconds. When the thermal fixing is carried out for the above-defined range of time, polyolefin molecules may be rearranged to remove residual stress of the porous membrane, and the problem of pore blocking of the porous membrane caused by partial melting may be reduced.

After that, the thermally fixed porous membrane is crosslinked in the presence of water (S6).

According to an embodiment of the present disclosure, the crosslinking may be carried out at 60-100° C., 65-95° C., or 70-90° C.

According to an embodiment of the present disclosure, the crosslinking may be carried out under a humidity of 60-95% for 6-50 hours.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

EXAMPLE 1

First, 10.5 kg of high-density polyethylene (Korea Petrochemical Ind. Co. Ltd., VH035) having a weight average molecular weight of 380,000 as polyolefin, 13.65 kg of liquid paraffin oil (Kukdong Oil & Chem. LP350F, dynamic viscosity 67.89 cSt at 40° C.) as the first diluting agent, 450 g of vinyltrimethoxysilane as an alkoxysilane containing a carbon-carbon double bonded group, 6 g of dibutyltin dilaurate as a crosslinking catalyst, and 6 g of 2,5-dimethyl-2,5-di(tert-butylperoxy)hexane (DHBP) as an initiator were introduced to and mixed in an extruder.

Next, 5.85 kg of liquid paraffin oil (Kukdong Oil & Chem. LP150F, dynamic viscosity 29.34 cSt at 40° C.) as the second diluting agent was introduced to and mixed in the extruder. Herein, the ratio (t2/t1) of the time (t2) elapsed from the introduction of the second diluting agent to the extrusion to the time (t1) elapsed from the introduction of the first diluting agent to the extrusion was 62% (0.62). In other words, the time (t2) elapsed from the introduction of the second diluting agent to the extrusion corresponded to about 0.62 times of the time (t1) elapsed from the introduction of the first diluting agent to the extrusion. Particularly, the time (t1) elapsed from the introduction of the first diluting agent to the extrusion was 52 seconds, and the time (t2) elapsed from the introduction of the second diluting agent to the extrusion was 32 seconds. Then, reactive extrusion was carried out at a temperature of 210° C. to obtain a silane-grafted polyethylene composition.

The resultant silane-grafted polyethylene composition was molded into a sheet-like shape through a T-die and cold casting roll, and then biaxial stretching was carried out by using a tenter-type sequential stretching machine performing MD stretching and then TD stretching. Both the MD stretching ratio and the TD stretching ratio were 7.5 times. The stretching temperature was 108° C. in MD and 121° C. in TD.

After that, the first diluting agent and the second diluting agent were extracted from the stretched sheet by using methylene chloride, and the sheet from which the diluting agents were extracted was thermally fixed at 124° C. to obtain a porous membrane. The porous membrane was crosslinked at 85° C. under a humidity condition of 85% for 48 hours to obtain a crosslinked polyethylene separator. The results are shown in the following Table 1.

EXAMPLE 2

A separator was obtained in the same manner as Example 1, except that the second diluting agent introduced to the extruder was changed (Kukdong Oil & Chem. LP100F, dynamic viscosity 19.08 cSt at 40° C.).

EXAMPLE 3

A separator was obtained in the same manner as Example 1, except that [Kukdong Oil & Chem. LP150F, dynamic viscosity 29.34 cSt at 40° C.] was used as the first diluting agent and [Kukdong Oil & Chem. LP100F, dynamic viscosity 19.08 cSt at 40° C.] was used as the second diluting agent.

COMPARATIVE EXAMPLE 1

A non-crosslinked polyolefin separator was obtained while not introducing a vinyl group-containing alkoxysilane, initiator and a crosslinking catalyst to an extruder.

Particularly, 10.5 kg of high-density polyethylene (Korea Petrochemical Ind. Co. Ltd., VH035) having a weight average molecular weight of 380,000 as polyolefin, and 19.5 kg of liquid paraffin oil (Kukdong Oil & Chem. LP350F, dynamic viscosity 67.89 cSt at 40° C.) as a diluting agent were introduced to and mixed in the extruder at once.

Then, extrusion was carried out at a temperature of 210° C. to obtain a polyethylene composition.

The resultant polyethylene composition was molded into a sheet-like shape through a T-die and cold casting roll, and then biaxial stretching was carried out by using a tenter-type sequential stretching machine performing MD stretching and then TD stretching. Both the MD stretching ratio and the TD stretching ratio were 7.5 times. The stretching temperature was 108° C. in MD and 121° C. in TD.

After that, the diluting agent was extracted from the strethced sheet by using methylene chloride, and the sheet from which the diluting agent was extracted was thermally fixed at 124° C. to obtain a non-crosslinked polyethylene separator. Herein, the resultant separator had a shut-down temperature of 140.3° C. Meanwhile, Comparative Example 1 to which a vinyl group-containing alkoxysilane was not introduced showed no IR peaks derived from silane crosslinking.

COMPARATIVE EXAMPLE 2

A separator was obtained in the same manner as Example 1, except that 10.5 kg of high-density polyethylene (Korea Petrochemical Ind. Co. Ltd., VH035) having a weight average molecular weight of 380,000 as polyolefin, 19.5 kg of liquid paraffin oil (Kukdong Oil & Chem. LP350F, dynamic viscosity 67.89 cSt at 40° C.) as a diluting agent, 450 g of vinyltrimethoxysilane as an alkoxysilane containing a carbon-carbon double bonded group, 6 g of dibutyltin dilaurate as a crosslinking catalyst, and 6 g of 2,5-dimethyl-2,5-di(tert-butylperoxy)hexane (DHBP) as an initiator were introduced to and mixed in an extruder at once.

COMPARATIVE EXAMPLE 3

First, 10.5 kg of silane-grafted polyolefin (Hyundae EP, XP650) and 19 kg of liquid paraffin oil (Kukdong Oil & Chem. LP350F, dynamic viscosity 67.89 cSt at 40° C.) were introduced to an extruder and mixed at 180° C., followed by extrusion.

Next, the extruded product was molded into a sheet-like shape through a T-die and cold casting roll, and then biaxial stretching was carried out by using a tenter-type sequential stretching machine performing MD stretching and then TD stretching. Both the MD stretching ratio and the TD stretching ratio were 7.5 times. The stretching temperature was 108° C. in MD and 121° C. in TD.

Then, 30 wt % of water dispersion containing 6 g of dibutyltin dilaurate as a crosslinking catalyst was applied to both surfaces of the product and the resultant product was immersed in hot water maintained at a temperature of 85° C. for 1 hour to complete silane crosslinking. After that, the resultant product was immersed in methylene chloride at room temperature for 30 minutes to extract liquid paraffin oil, and then dried in an oven at 80° C. for 30 minutes to remove the extraction solvent. The results are shown in the following Table 1.

TEST EXAMPLES (1) Method for Determining IR Peak Intensity

Figure 3:
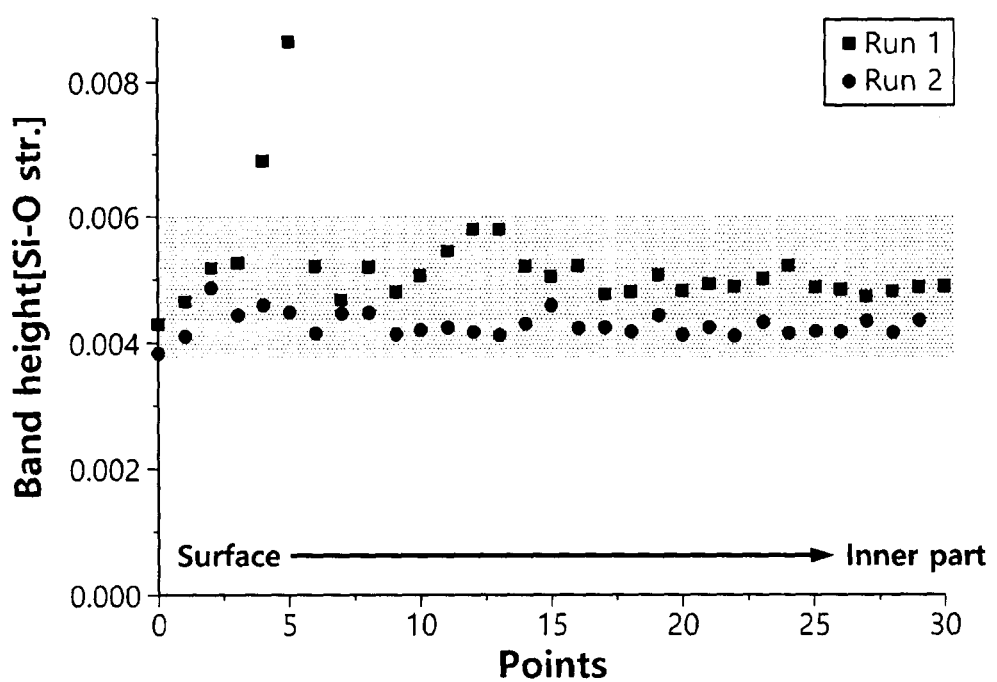
FIG. 3 shows silane crosslinking (Si-0) stretching peak intensities in the thickness direction of the separator according to an embodiment of the present disclosure.

The silane crosslinking IR peaks of the surface portion and inner part of each of the separators according to Examples 1-3 and Comparative Examples 2 and 3 were determined by the following method. Particularly, a separator specimen was prepared and subjected to inclined cutting at an inclination angle of 1° in the thickness direction of the separator by using an inclined cutting analyzer (SAICAS). After the cutting, the separator was divided into 30 equal parts in the thickness direction of the separator by using a Fourier transformation-Infrared (FT-IR) microscopy spectrometer (Agilent, Cary 620) to perform analysis. FIG. 3 shows the results of silane crosslinking IR peak intensities at 30 points divided into equal parts in the thickness direction of the separator, after carrying out determination 2 times. After carrying out determination 2 times, all IR peak intensities were observed in a range of 0.004-0.006 $cm^{-1}$. It can be seen from the results that uniform crosslinking was accomplished in the thickness direction of the separator according to Example 1.

(2) Method for Determining Shut-Down Temperature

First, each of the separators according to Examples 1-3 and Comparative Examples 1-3 was introduced to an electrolyte (1M $LiPF_6$ in ethylene carbonate:ethylmethyl carbonate=5:5).

Then, the shut-down temperature was defined by the point where ion conductivity becomes 0, while increasing the temperature from 30° C. at a rate of 5° C./min, and the temperature at this point was measured.

(3) Method for Determining Melt-Down Temperature

The melt-down temperature is determined by taking a sample each in the machine direction (MD) and the transverse direction (TD) perpendicular to MD and analyzing the same through thermomechanical analysis (TMA). Particularly, a sample having a length of 10 mm is introduced to a TMA instrument (TA instrument, Q400) and exposed to an increasing temperature condition (heating rate 5° C./min. from 30° C.), while applying a tension of 19.6 mN thereto. As the temperature is increased, the sample undergoes a change in length, and the temperature at which point the sample length is increased rapidly to cause fracture is measured. The temperature is measured each in MD and TD, and the higher temperature is defined as the melt-down temperature of the corresponding sample.

(4) Method for Determining Resistance of Separator

A separator was inserted into a coin cell (CR2032), and a non-aqueous electrolyte (1M $LiPF_6$ in ethylene carbonate:diethyl carbonate=3:7) was injected thereto to prepare a coin cell. After the coin cell was allowed to stand at room temperature for 6 hours so that it might be impregnated sufficiently with the electrolyte, impedance was determined in an electrochemical analyzer (Multi-Potentiostat/Galvanostat, AMETEK Co., VersaSTAT 4) in a range of 10 kHz to 100 kHz. Then, linear interpolation was carried out to determine the real number value of impedance, when the imaginary number value of impedance is 0, as electric resistance.

(5) Method for Evaluating Battery Safety

Each of the separators according to Examples 1-3 and Comparative Examples 1-3 was inserted to a battery, and the resultant battery was fully charged. Then, a nail penetration test was carried out under the condition of GB/T (nail diameter 5 mm, penetration rate 25 mm/sec). When no ignition is observed in a battery 12 hours after the nail penetration, the battery is judged as 'pass'.

(6) Method for Evaluating Capacity Maintenance

Each of the separators according to Examples 1-3 and Comparative Examples 1-3 was inserted to a lithium secondary battery, and the resultant lithium secondary battery was subjected to initial (first) charge/discharge by using an electrochemical charger. Herein, charge was carried out by applying electric current at a current density of 0.1C-rate to a voltage of 4.3V, and discharge was carried out to 2.5 V at the same current density. The charging/discharging cycles were carried out for 200 times.

During the above-mentioned charge/discharge cycles, the voltage and capacity of the positive electrode and negative electrode used in each battery were measured.

The capacity maintenance of each battery was calculated according to the following formula:

Capacity maintenance (%)=(Capacity at the 200$^{th}$ cycle/Initial capacity)×100

(7) Method for Determining Crosslinking Degree

The crosslinking degree (gel proportion) was determined by using xylene as a solvent based on ASTM D2765. Particularly, a separator specimen was immersed in xylene under reflux for 12 hours to dissolve the polymer, dried and then weighed.

(8) Method for Determining Silane (Si) Content in Separator

First, a separator specimen was allowed to react with sulfuric acid and subjected to sulfation on a hot plate, and then sulfuric acid was removed. Next, the specimen was calcined in an electric furnace (temperature 600° C.) for 4 hours and decomposed into nitric acid and hydrogen peroxide. Then, when the specimen was dissolved clearly, it was diluted with tertiary ultrapure water to prepare a sample to be analyzed.

The silane content in the separator was determined by using an inductively coupled plasma with mass spectrometer (ICP-MS, Axiom model), wherein MC-ICP-MS, Axiom is AXIOM MC model available from Thermo Elemental Ltd. (UK) and is also provided with a high-resolution function.

(9) Method for Determining Crosslinking Density in Separator

The crosslinking density was calculated by using a swelling ratio based on the Flory-Huggin theory and Flory-Rehner equation. The interaction parameter ($\chi$) was calculated based on the Flory-Huggin theory, wherein the mixing free energy ($\Delta G$) is a function of the volume fraction ($\upsilon p$) of a polymer and interaction parameter ($\chi$), and the case wherein the mixing free energy is 0 ($\Delta G=0$) is the swelling condition in an equilibrium state.

$\Delta G=RT\{ln(1-\upsilon p)+\upsilon p+\chi \upsilon p^2\}$ Flory-Huggin theory [Mathematical Formula 1]

The Flory-Rhener equation was used to determine the crosslinking density. Herein, N is crosslinking density (mol/L), and Vs is the molar volume (L/mol) of a solvent.

$-[ln(1-\upsilon p)+\upsilon p+\chi \upsilon p^2]=NVs[\upsilon p^{1/3}-\upsilon p/2]$ Flory-Rehner equation [Mathematical Formula 2]

(10) Method for Determining Tensile Strength

Each of the separators according to Examples 1-3 and Comparative Examples 1-3 was cut into a size of 15 mm×100 mm to prepare a sample. Then, the prepared samples were used and drawn in MD at a rate of 500 mm/min according to ASTM-D882. Then, the strength at the point where the specimen was broken was measured.

(11) Method for Determining Heat Shrinkage

The heat shrinkage was calculated according to the formula of (Initial length−length after carrying out heat shrinking at 120° C. for 1 hour)/(Initial length)×100

TABLE 1

|  | Ex. 1 | Ex. 2 | Ex. 3 | Comp. Ex. 1 | Comp. Ex. 2 | Comp. Ex. 3 |
| --- | --- | --- | --- | --- | --- | --- |
| Separator thickness (μm) | 9.0 | 9.0 | 9.0 | 9.0 | 9.0 | 9.0 |
| Resistance (ohm) | 0.36 | 0.33 | 0.33 | 0.34 | 0.61 | 0.55 |
| Shut-down temperature (° C.) | 139.1 | 138.6 | 138.4 | 140.3 | 138.9 | 138.4 |
| Melt-down temperature (° C.) | 193.3 | 191.9 | 192.2 | 149.1 | 190.5 | 194.9 |
| Silane crosslinking IR peak intensity in thickness direction of separator | 0.0050 | 0.0049 | 0.0048 | — | 0.0063 | 0.0071 |
| Ratio (B/A) of silane crosslinking IR peak intensities | 0.98 | 0.99 | 0.96 | — | 0.77 | 0.83 |
| Ratio (C/A) of silane crosslinking IR peak intensities | 0.95 | 0.98 | 0.93 | — | 0.51 | 0.71 |
| Silane (Si) content (ppm) in separator | 690 | 710 | 700 | — |  | 820 |
| Crosslinking degree (%) | 76 | 78 | 77 | 0 | 80 | 83 |
| Capacity maintenance (%) | 96.4 | 96.7 | 95.9 | 96.0 | 91.8 | 92.4 |
| Nail safety test | Pass | Pass | Pass | Fail | Pass | Pass |
| Crosslinking density (mol/L) | 0.045 | 0.040 | 0.048 | 0 | 0.057 | 0.065 |

TABLE 1-continued

|  | Ex. 1 | Ex. 2 | Ex. 3 | Comp. Ex. 1 | Comp. Ex. 2 | Comp. Ex. 3 |
|---|---|---|---|---|---|---|
| Tensile strength (MD, kgf/cm$^2$) | 1720 | 1690 | 1710 | 1750 | 1520 | 1480 |
| Heat shrinkage (TD, %, 120° C., 1 hr) | 8.8 | 8.2 | 8.4 | 11.5 | 10.2 | 10.9 |

What is claimed is:

1. A crosslinked polyolefin separator comprising silane-crosslinked polyolefin, wherein silane crosslinking in the crosslinked polyolefin separator shows an Infrared Spectroscopy (IR) peak intensity in a thickness direction of 0.001-0.012, and a ratio (B/A) of IR peak intensity (B) of silane crosslinking at a center portion in the thickness direction of the separator to IR peak intensity (A) of silane crosslinking on one surface of the separator is 0.9-1.2.

2. A crosslinked polyolefin separator comprising silane-crosslinked polyolefin, wherein silane crosslinking in the crosslinked polyolefin separator shows an Infrared Spectroscopy (IR) peak intensity in a thickness direction of 0.001-0.012, and a ratio (C/A) of IR peak intensity (C) of silane crosslinking at a point corresponding to ¼ of a total thickness of the separator from one surface of the separator to IR peak intensity (A) of silane crosslinking on one surface of the separator is 0.9-1.5.

3. The crosslinked polyolefin separator according to claim 1, wherein a silane crosslinking IR peak appears at 1030 cm$^{-1}$.

4. The crosslinked polyolefin separator according to claim 1, wherein a content of Si in the separator is 150-900 ppm based on 100 parts by weight of the separator.

5. The crosslinked polyolefin separator according to claim 1, which wherein the separator has a crosslinking degree of 15-90%.

6. The crosslinked polyolefin separator according to claim 1, wherein the separator has a crosslinking density (number of Si—O—Si crosslinking spots per unit volume) of 0.01 mol/L or more.

7. A method for manufacturing a crosslinked polyolefin separator, comprising:
(S1) introducing a reactive extrusion composition comprising polyolefin having a weight average molecular weight of 200,000-1,000,000, a first diluting agent, alkoxysilane containing a carbon-carbon double bonded group, an initiator and a crosslinking catalyst to an extruder;
(S2) subsequently introducing a second diluting agent to the reactive extrusion composition comprising in the extruder to carry out reactive extrusion of a silane-grafted polyolefin composition;
(S3) molding the reactive extruded silane-grafted polyolefin composition into a form of a sheet, and stretching the sheet;
(S4) extracting the first diluting agent and the second diluting agent from the stretched sheet to obtain a silane-grafted polyolefin porous membrane;
(S5) thermally fixing the porous membrane; and
(S6) crosslinking the porous membrane in the presence of water.

8. The method according to claim 7, wherein a ratio (t2/t1) of a time (t2) elapsed from the introducing of the second diluting agent to the reactive extrusion to a time (t1) elapsed from the introducing of the first diluting agent to the reactive extrusion composition is 0.1-0.7.

9. The method according to claim 7, wherein a weight ratio of the first diluting agent to the second diluting agent is 50:50-80:20.

10. The method according to claim 7, wherein each of the first diluting agent and the second diluting agent independently comprises liquid paraffin oil, solid paraffin oil, mineral oil, wax, soybean oil, phthalates, aromatic ethers, C10-C20 fatty acids, C10-C20 fatty acid alcohols, fatty acid esters or a mixture of at least two thereof.

11. The method according to claim 7, wherein the second diluting agent has a dynamic viscosity equal to or lower than a dynamic viscosity of the first diluting agent.

12. The method according to claim 11, wherein each of first diluting agent and the second diluting agent independently has a dynamic viscosity of 5-100 cSt at 40° C., and a difference in dynamic viscosity between the first diluting agent and the second diluting agent is 5 cSt or more.

13. The method according to claim 12, wherein the difference in dynamic viscosity between the first diluting agent and the second diluting agent is 10 cSt or more.

14. The method according to claim 7, wherein a total content of the first diluting agent and the second diluting agent is 100-350 parts by weight based on 100 parts by weight of the polyolefin.

15. The method according to claim 7, wherein the alkoxysilane containing a carbon-carbon double bonded group comprises a compound represented by following Chemical Formula 1:

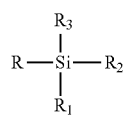

[Chemical Formula 1]

wherein each of $R_1$, $R_2$ and $R_3$ independently represents a C1-C10 alkoxy group or C1-C10 alkyl group, wherein at least one of $R_1$, $R_2$ and $R_3$ represents an alkoxy group; and
R represents a vinyl group, acryloxy group, methacryloxy group, or a C1-C20 alkyl group, wherein at least one hydrogen atom of the alkyl group is substituted with a vinyl group, acryl group, acryloxy group, methacryloxy group, or methacryl group.

16. The method according to claim 15, wherein the alkoxysilane containing a carbon-carbon double bonded group comprises vinyltrimethoxysilane, vinyltriethoxysilane, vinyltriacetoxysilane, (3-methacryloxypropyl)trimethoxysilane, (3-methacryloxypropyl)triethoxysilane, vinylmethyl dimethoxysilane, vinyl-tris(2-methoxyethoxy) silane, vinylmethyldiethoxysilane or a mixture of at least two thereof.

17. The method according to claim 7, wherein a content of the alkoxysilane containing a carbon-carbon double bonded group is 0.1-3.0 parts by weight based on 100 parts by weight of a total weight of the polyolefin, the first diluting agent and the second diluting agent, and a content of the initiator is 0.1-20 parts by weight based on 100 parts by weight of the alkoxysilane containing a carbon-carbon double bonded group.

18. The method according to claim 7, wherein a content of the crosslinking catalyst is 0.1-20 parts by weight based on 100 parts by weight of the alkoxysilane containing a carbon-carbon double bonded group.

19. The methodr according to claim 7, wherein the crosslinking catalyst comprises dibutyltin dilaurate, dibutyltin diacetate, stannous acetate, stannous caprylate, zinc naphthenate, zinc caprylate, cobalt naphthenate, ethylamine, dibutylamine, hexylamine, pyridine, sulfuric acid, hydrochloric acid, benzoic acid, sulfonic acid, acetic acid, stearic acid, maleic acid or a mixture of at least two thereof.

20. The method according to claim 7, wherein the thermal fixing is carried out at a temperature of 100-140° C.

* * * * *